United States Patent [19]
Wittrisch et al.

[11] Patent Number: 5,505,259
[45] Date of Patent: Apr. 9, 1996

[54] MEASURING DEVICE AND METHOD IN A HYDROCARBON PRODUCTION WELL

[75] Inventors: Christian Wittrisch, Rueil Malmaison; Jean-Baptiste Fay, Paris, both of France

[73] Assignee: Institut Francais Du Petrole, Rueil Malmaison, France

[21] Appl. No.: 340,415

[22] Filed: Nov. 15, 1994

[30]   Foreign Application Priority Data

Nov. 15, 1993 [FR] France .................................. 93 13703

[51] Int. Cl.⁶ .......................... E21B 17/00; E21B 19/22; E21B 23/10; E21B 47/12
[52] U.S. Cl. .................... 166/250.01; 166/65.1; 166/77.1; 166/383; 166/385
[58] Field of Search ................................ 166/250, 385, 166/65.1, 50, 113, 77.1, 383

[56]         References Cited

U.S. PATENT DOCUMENTS 5,080,175  1/1992  Williams ................. 166/385
5,111,880  5/1992  Wittrisch et al. ............ 166/385 X
5,184,682  2/1993  Delacour et al. .............. 166/385
5,234,058  8/1993  Sas-Jaworsky et al. ........ 166/385

FOREIGN PATENT DOCUMENTS 85989       7/1985  European Pat. Off. .
2434366     3/1989  France .
8621304.0   2/1987  Germany .
87/04755    8/1987  WIPO .

Primary Examiner—Stephen J. Novosad
Attorney, Agent, or Firm—Millen, White, Zelane, & Branigan

[57]             ABSTRACT

A measuring device in a hydrocarbon producing well includes a rod made from a composite material stiff against compression and flectionally elastic. An information transfer line is contained in the rod. The rod includes a plurality of measuring stations thereon and it is suited for being wound on a reel. The device is utilized to practice a measuring method.

16 Claims, 3 Drawing Sheets

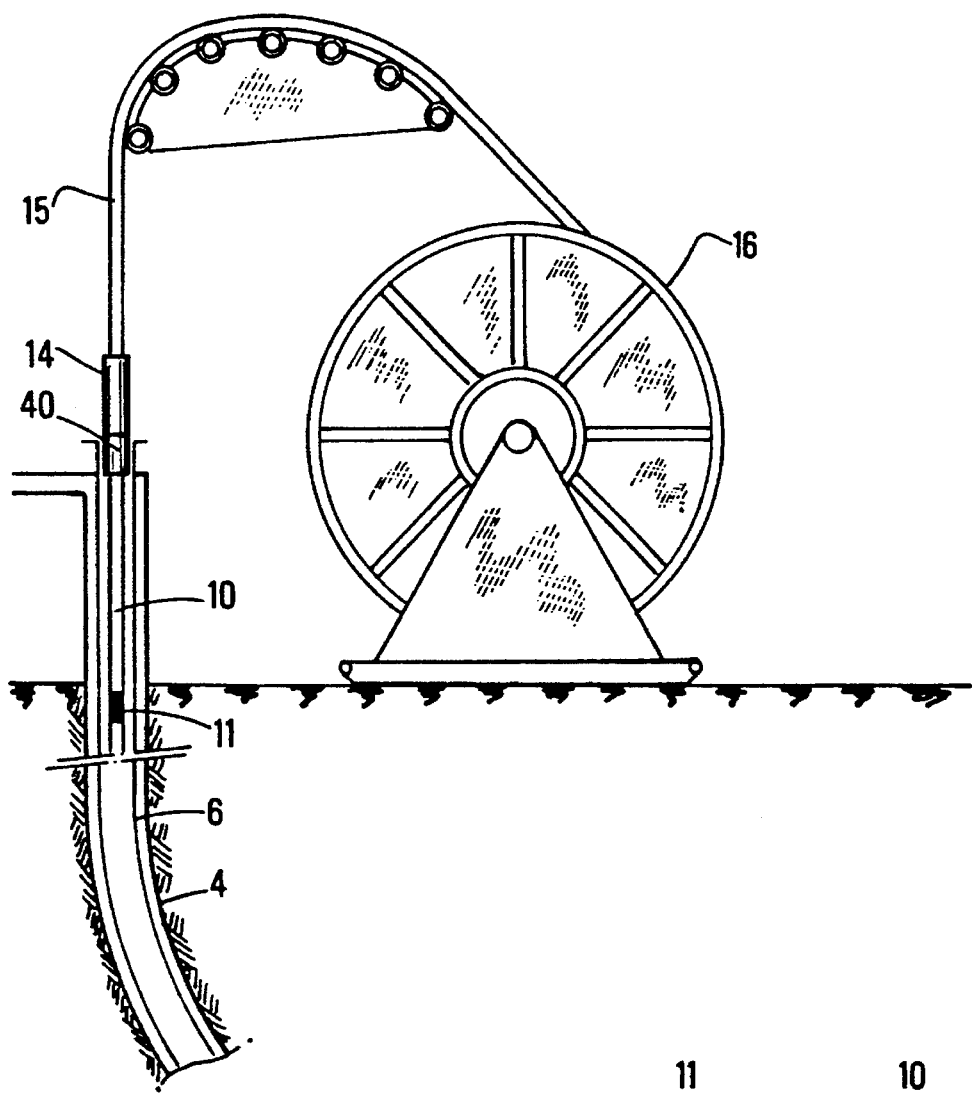
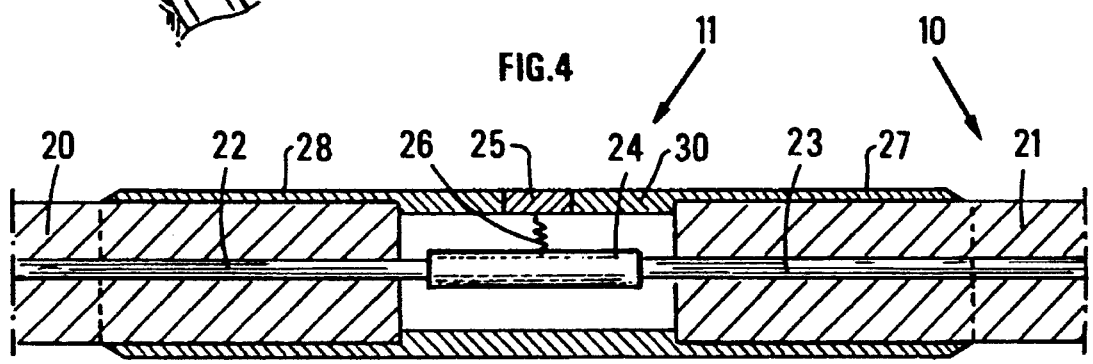

MEASURING DEVICE AND METHOD IN A HYDROCARBON PRODUCTION WELL

FIELD OF THE INVENTION

The present invention relates to a measuring device and method in a hydrocarbon production well.

The device includes measuring means which may be spaced out by a predetermined distance and most of the measurements may be achieved substantially simultaneously with the flow of the effluent coming from a producing formation.

BACKGROUND OF THE INVENTION

U.S. Pat. No. 5,184,682 describes a known rod made from a composite material which may be pulled or pushed into a well or in a tube placed in a well. A line, for example an electric line, is embedded in the rod and allows a measuring and/or servicing device fastened to the end of the rod to be connected. However, to perform a series of measurements over the total length of the production drain hole, the measuring device has to be moved by acting upon the rod located in the drain hole by winding or unwinding from a reel.

SUMMARY OF THE INVENTION

The present invention thus relates to a measuring device in a hydrocarbon production well, including a rod made from a composite material flectionally elastic and stiff against compression, at least one line suited for energy and/or measurement transfer being embedded in said rod. The rod includes a plurality of measuring means distributed over its length and connected by said line, and the rod equipped with its measuring means is suited for being wound on a reel.

The device may include electronic means for managing the measurements performed by said measuring means.

The device may include means for pushing the rod into the well, said means being secured with an end of said rod located at the closest distance from the surface.

The device may include a cable comprising at least one transmission line, an electric conductor or an optical fiber for example, said cable connecting said push means to the surface.

The push means may include seal means suited to the pumping said rod towards the bottom of the well.

The measuring means may be suited to at least one of the following measurements: temperature, pressure and resistivity.

The invention further relates to a measuring method in a hydrocarbon production well comprising setting a rod made from a composite material flectionally elastic and stiff against compression in the length of the well drilled through a geologic formation producing hydrocarbons, an energy and/or measurement transfer line being embedded in said rod. The method comprises the following stages:

a) providing said rod with a plurality of measuring means distributed over its length and connected by said line, b) winding said rod provided with its measuring means on a reel, c) driving said rod into the well by unwinding it from the reel, d) setting said measuring means of said rod at the level of the producing formation, e) transmitting the measurements achieved by said measuring means during the production of hydrocarbons to the ground surface.

In a variant of the method, push means may be fastened to the upper end of said rod in order to carry out stage d).

In the method, said push means may include seal means between the rod and a tubular string introduced into the well, and a fluid may be pumped into said string in order to move the rod towards the bottom of the well.

Said rod may be connected to the surface by a cable fastened to the push means, said cable including at least one transmission line, for example an electric conductor or an optical fiber.

Measurements from the plurality of measuring means may be managed by electronic means located at the upper end of said rod and connected to the surface by at least said cable line.

The method and the device according to the invention may be applied to a strongly inclined or substantially horizontal well in a geologic formation producing hydrocarbons.

BRIEF DESCRIPTION OF THE DRAWINGS

Other features and advantages of the present invention will be clear from reading the description hereafter of embodiments given by way of non limitative examples, with reference to the accompanying figures in which:

FIG. 2 shows the stage of assembling of the push means of the rod, FIG. 4 shows an embodiment of the rod equipped with a measuring means.

DESCRIPTION OF THE PREFERRED EMBODIMENTS

Figure 1:
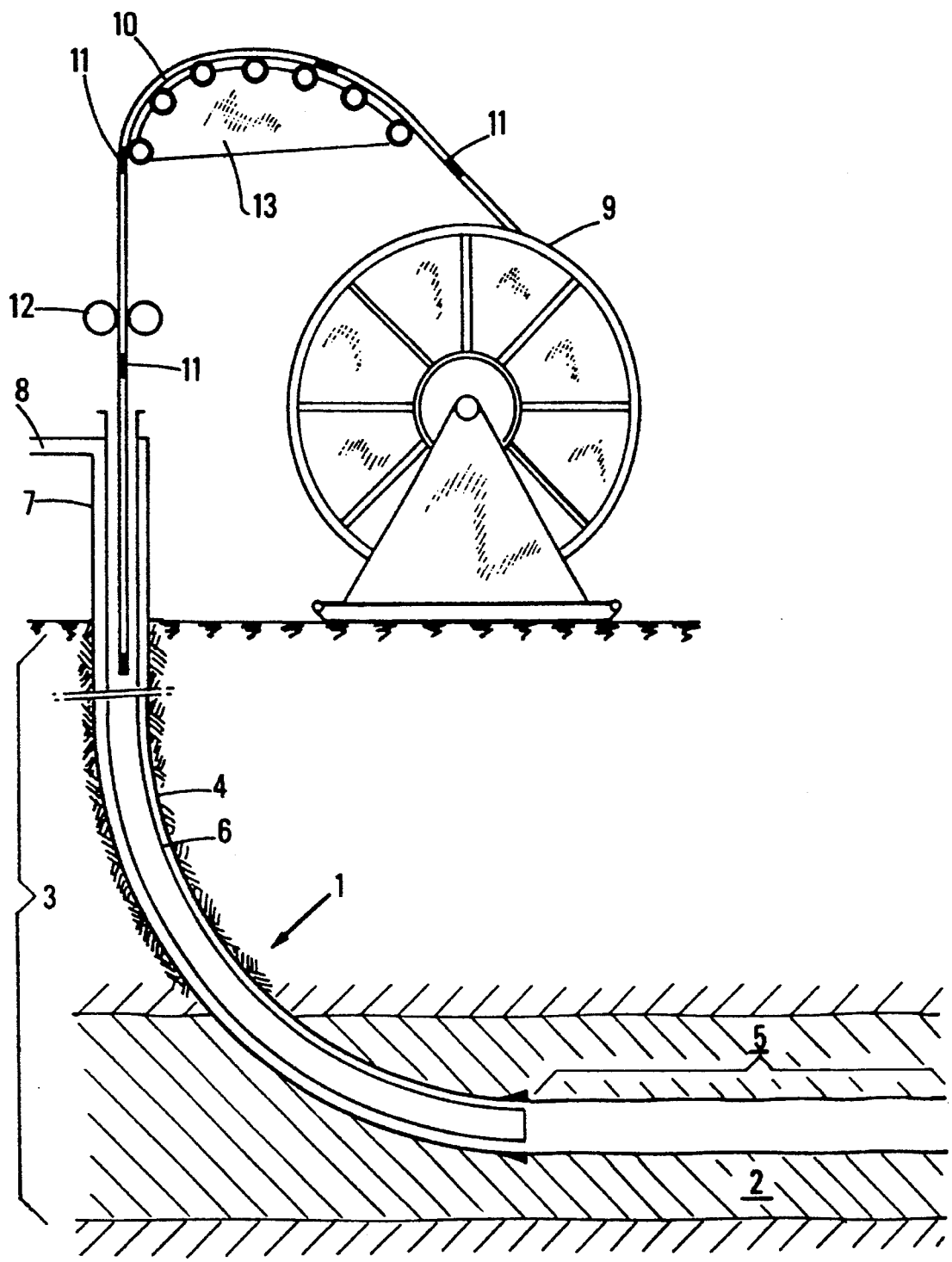
FIG. 1 shows the introduction of the rod according to the invention into the well.

In FIG. 1, a well 1 is drilled in the ground down to a hydrocarbon producing geologic formation or hydrocarbon reservoir 2. A first portion 3 of the well is cased with a tubular string 4 down to substantially said formation 2. The well continues in formation 2 substantially horizontally by a drilled drain hole 5. A tubular string 6 is run into the first part 3 of well 1, the lower end of string 6 being located in the inner space of string 4, the upper end thereof being fastened to the surface by conventional hang means contained in wellhead 7.

The producing formation 2 may produce in an eruptive way, i.e. the pressure of the effluent contained in the formation is sufficient for the effluent to flow up and to run to the surface, for example through pipe 8. In this case, prior to any operation in the well, it is a common thing to equalize the pressure of the effluent by setting in the well a fluid having such a density that the hydrostatic pressure generated at the level of the reservoir is at least equal to the pressure of the effluent of the reservoir. The well is thus stable and there will be no flow of fluid at the wellhead. Setting of the control fluid may be achieved by injecting it from the inside of string 6, the back circulation taking place through the annular space between strings 6 and 4. Production is generally restarted in the same way by discharging the equalizing fluid by means of a lighter fluid.

The semirigid rod 10 in accordance with the invention, provided with a plurality of measuring means 11 distributed according to predetermined spacings, is wound on a reel 9. Rod 10 is introduced into string 6 by unwinding from reel 9 and possibly with the aid of injection means 12 for injecting rod 10. These injection means may be, for example, those described in patent U.S. Pat. No. 5,184,682, or more simply motorized wheels tightened on the rod. A race 13 guides the rod between wellhead 7 and the reel.

In case of an eruptive well, the conventional method which consists in running elements into a well against pressure, referred to as snubbing, may be used. The pressure control and safety equipments may be installed on string 6 at the level of wellhead 7.

FIG. 2 shows the introduction of the length of rod 10 according to the invention into string 6. The length of rod 10 is preferably at least equal to the length of the part 5 of the well drilled through the producing geologic layer. Push means 14 forming a pushing piston is fastened to the upper end of the rod. The main function of push means 14 is to help to set rod 10 in the well, by applying a thrust force resulting for example from the own weight of the push means or from the action of a pumping operation in string 6.

Insofar as gravity forces may be used, the push means may consist of load bars, drill collars or elements whose weight is sufficient to push the rod into its measuring position. Of course, these push means are suited for allowing connection of the transfer line of rod 10 to a surface communication line. Such conventional push means are known to the man skilled in the art and are not described here.

In case the inclination of the wellbore is such that the weight is not sufficient to push the rod, or if the dimension of robe 6 is such that weighting elements cannot be used, push means working according to the principle of a piston pushed by pumping of a fluid into robe 6 may be used. Such push means may for example be those described in patent U.S. Pat. No. 4,729,429.

Linking means 15 are connected to rod 10, notably through push means 14. Linking means 15 fulfil at least the following functions:

connection of the transfer line of rod 10 to measurement recording and/or processing equipments at the surface, mechanical link to allow setting or withdrawal of rod 10 in or from the well.

The linking means may be a logging type cable conventionally used in the profession to carry out measurings in a well. This cable, including at least one electric conductor, is wound on or unwound from an auxiliary winch 16. Reel 9 (FIG. 1) may also be used as an auxiliary winch 16.

Optical fibers may be used without departing from the scope of the invention.

Linking means 15 may also be a composite rod according to patent U.S. Pat. No. 5,184,682. The information or measurement transfer line is connected to the line of rod 10. In this case, said linking means 15 are preferably wound on the reel 9 on which rod 10 may be wound.

In an equivalent way, the linking means may be a continuous metallic tube or coil tubing which may also be wound on a reel. This continuous tube is advantageously provided with a cable including at least one electric conductor, said cable being located in the inner space of the tube.

Without departing from the scope of the present invention, the cable may be located outside, instead of inside the continuous tube, in the annular space defined by the continuous tube 15 and string 6. In this variant, the conducting cable is unwound parallel to the unwinding of the tube, for example from an auxiliary winch. Similarly, instead of being continuous and wound on a reel, the tube may be an assembly of unitary lengths of tubes. Rod 10 is then moved by adding or by removing tube lengths.

Electronic means 40 for managing the plurality of measuring means 11 are preferably placed at the upper end of rod 10. These means 40 are suited for managing the acquisition of information provided by the sensors of measuring means 11, for providing power supply, for transmitting information through the line(s) of linking means 15. To that effect, electronic means 40 may include notably coding and/or multiplexing equipments.

Figure 3:
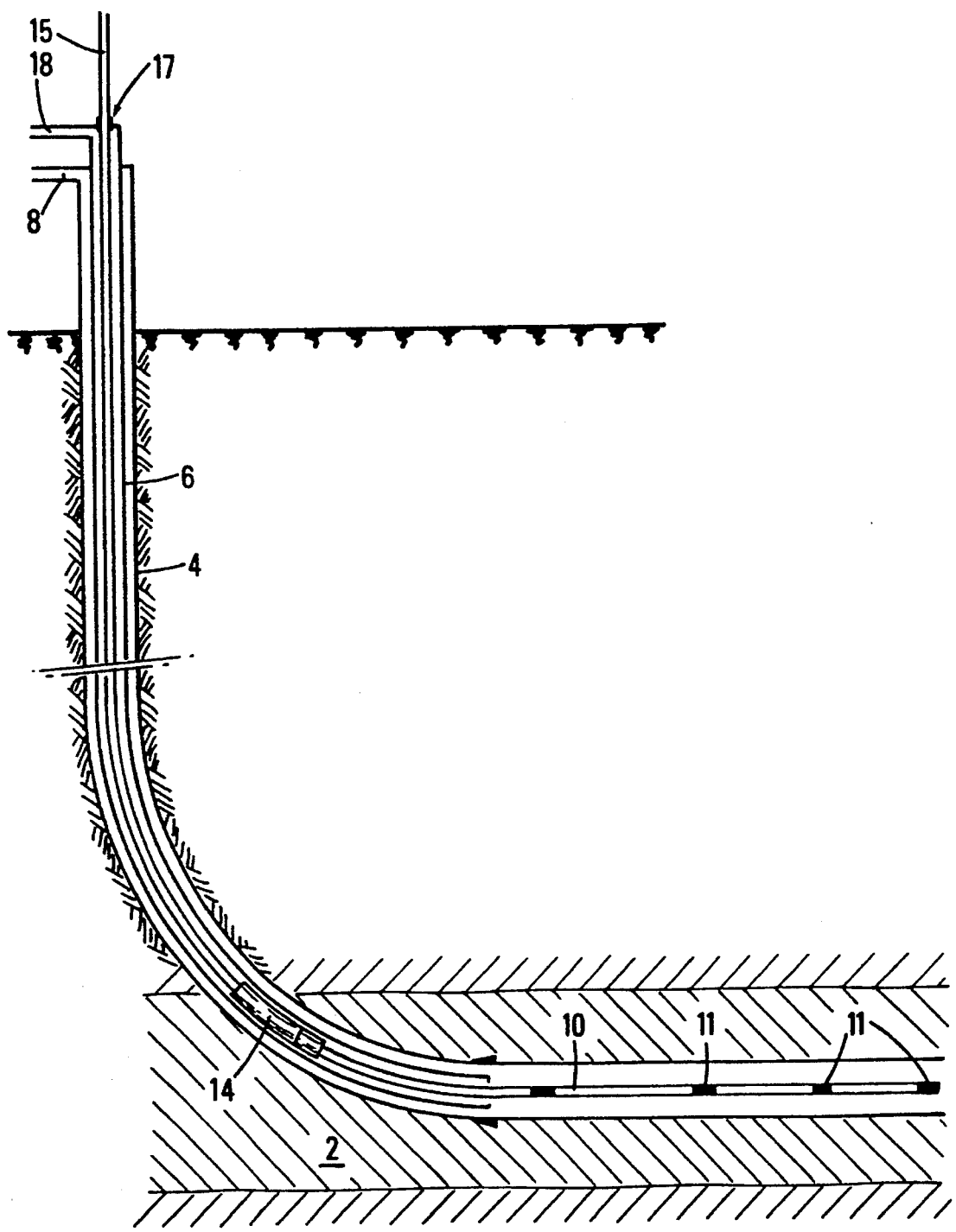
FIG. 3 shows the setting of the rod in the well.

FIG. 3 shows the positioning of rod 10 at the level of the producing formation 2. Measuring means 11, spaced out by several meters, for example from 10 to 50 meters, are in a position of acquisition of measurements at various points of the drain hole drilled through the producing formation.

Seal means 17 around linking means 15 are screwed onto the upper end of string 6 to allow injection or backflow, through pipe 18, of a circulating fluid in string 6. A circulating fluid may thus be pumped in the well from pipe 18, the fluid flowing then back through pipe 8, or conversely.

This layout is necessary in case of a variant in which push memos 14 are actuated by hydraulic pumping. Hydraulic push means 14 advantageously include a system for bypassing the seal elements of the push means so as to allow, if need be, circulation in the string of tubes 6 at least in the bottom-surface direction, in spite of the presence of the push means in said string. Realization of such a bypass is described in patent U.S. Pat. No. 4,729,429.

The effluent produced may thus flow up towards the surface either through the inside of string 4, or through the inside of string 6, or through both strings.

In case of a non eruptive producing formation, pumping means may be run into well 1 inside string 4, beside string 6.

FIG. 4 shows one of the measuring means 11 which rod 10 is equipped with. Rod 10 is made up of a certain number of sections made from a composite material whose ends 20 and 21 are connected by a coupling 30. This coupling 30 is preferably metallic and includes two collars 28 and 27 secured with ends 20 and 21 by sticking or by crimping. The sensitive elements 25 of the measuring means are generally fastened in the central part of coupling 30. The sensitive elements may be suited for measuring the temperature, the pressure, the nature of the fluids outside the coupling, and particularly for differentiating between water and hydrocarbons, or for detecting vibrations.

Information transfer lines 22 and 23 included in each rod section are connected by a connection means 24 which also connects the transfer line to sensitive element 25 through line 26. A measuring means may include several sensitive elements of the same type or of different types.

Each coupling 30 is sufficiently rigid to give rod 10 a rigidity equivalent to that of a section made from a composite material, but the length of coupling 30 and the material used allow a determined flectional bend in order to enable winding on a reel.

The dimensions of rod 10 may range between 10 mm and 25 mm, according to the longitudinal resistance wanted for the rod, considering also the number and type of lines contained in said rod, and the size of the reel on which said rod is wound. For example, a 16 mm rod including a line comprising 8 electric conductors may be wound on an about 2 m diameter reel while undergoing only elastic deformations. The longitudinal resistance of such a rod made from glassfiber-reinforced thermosetting resin is about 10 tons. For such a rod, the outside diameter of couplings 30 may range between 20 mm and 25 mm.

A procedure example is described hereafter:

The configuration shown in FIG. 1 is selected, the producing formation 2 crossed by a horizontal drain hole being eruptive.

A brine-based fluid is injected through string 6 so as to fill the inside of string 4 and the inside of string 6 with this brine up to a height contained between formation 2 and the surface. The density of the brine is so adjusted that the hydrostatic column of the fluid equalizes the pressure of formation 2.

The rod equipped with its measuring means is run into string 6 by unwinding the reel on which the rod is stored.

The upper end of the rod is hung at the level of the wellhead when the total length of the rod is introduced.

Running of the measuring means and of the electronic means of the rod are controlled.

The hydraulic push means are fastened.

The line of the rod is connected to the line of the logging cable forming the linking means.

A swivel is installed on string 6.

Brine is pumped through the swivel so as to move the rod towards the well bottom while unwinding the logging cable.

The rod is pushed into drain hole 5.

The bypass of the push means is opened, for example by exerting a determined traction on the logging cable.

The brine is driven out of the well by circulating a lighter fluid and by injecting it through string 6, the fluid passing then through the bypass to flow up to the surface through string 4. The pressure is controlled by means of a surface flow regulation valve installed on the backflow line.

Formation 2 is made to produce.

The information acquired by the rod sensors and transmitted through the transmission line of the logging cable during production is recorded.

We claim:

1. A measuring device in a hydrocarbon production well, including a rod of a selected length made from sections of composite material, the rod having a longitudinal axis and being flectionally elastic about the longitudinal axis and stiff against compression in the direction of the axis, at least one line suited for energy and/or measurement transfer embedded in said rod, said rod including a plurality of measuring means distributed in spaced relation along the length of the rod in rigid sections joined by the sections of composite material and connected to one another by said line, and a reel for mounting the rod thereon wherein the rod is wound on the reel for storage and transport and unwound from the reel when inserted in the well.

2. A device as claimed in claim 1, comprising electronic means for managing the measurements achieved by said measuring means.

3. A device as claimed in claim 1, comprising means for pushing the rod in the well, said means being secured with an end of said rod located at the nearest distance from the surface.

4. A device as claimed in claim 3, further comprising a cable including at least one electric transmission line, said cable connecting said push means to the surface.

5. A device as claimed in claim 3, wherein the push means is a pushing piston including seal means attached to the rod for sealing with a string tube suited to the pumping of said rod towards the well bottom.

6. The device of claim 3, further comprising a cable including at least one optical fiber transmission line.

7. A device as claimed in claim 1, wherein said measuring means are suited to at least one of the following measurements: temperature, pressure and resistivity.

8. The device of claim 1, wherein the rigid sections of each include sensing means on surface areas thereof and connectors within the rigid sections for connecting the sensing means to the line.

9. The device of claim 1, further including a pushing piston located at the juncture of the rod and a linking flexible member attaching the rod to the reel, the pushing piston being received in and sealing with a string tube within the well wherein when fluid pressure is applied to the pushing piston, the rod descends into the well.

10. A measuring method in a hydrocarbon production well, comprising setting a rod made from a composite material flectionally elastic and stiff against compression in the length of the well drilled through a hydrocarbon producing geologic formation, an energy and/or measurement transfer line being embedded in said rod, comprising the following stages:

a. providing said rod with a plurality of measuring means distributed over its length and connected by said line Wherein the measuring means are rigid and are separated by and connected to one another by sections of flexible composite material, b. winding said rod provided with its measuring means on a reel by flexing said rod at said sections of flexible composite material, c. driving said rod into the well by unwinding it from the reel to provide an axial force to said rod, d. setting said measuring means of said rod at the level of the producing formation, e. transmitting to the ground surface the measurements achieved by said measuring means during the production of hydrocarbons.

11. A method as claimed in claim 10, wherein push means are fastened to the upper end of said rod in order to carry out stage d).

12. A method as claimed in claim 11, wherein said push means includes a seal between the rod and a tubular string introduced in the well, and further including the step of pumping a fluid into said string to move the rod towards the well bottom by applying pressure to the seal.

13. A method as claimed in claim 11, wherein said rod is connected to the surface by a cable fastened to the push means, said cable including at least one electric transmission line.

14. A method as claimed in claim 13, wherein the measurements achieved by the plurality of measuring means are managed by electronic means located at the upper end of said rod and connected to the surface by at least said cable line.

15. The method of claim 11, wherein said rod is connected to the surface by a cable fastened to the push means, said cable including at least one optical transmission line.

16. Application of the method as claimed in claim 10, wherein the well is a strongly inclined or substantially horizontal well in a hydrocarbon producing geologic formation.

* * * * *